United States Patent [19]
Achilles et al.

[11] Patent Number: 5,983,327
[45] Date of Patent: Nov. 9, 1999

[54] DATA PATH ARCHITECTURE AND ARBITRATION SCHEME FOR PROVIDING ACCESS TO A SHARED SYSTEM RESOURCE

[75] Inventors: Heather D. Achilles, Hudson, N.H.; Edward S. Harriman, Bedford, Mass.

[73] Assignee: Nortel Networks Corporation, Montreal, Canada

[21] Appl. No.: 08/566,047

[22] Filed: Dec. 1, 1995

[51] Int. Cl.$^6$ .................................................. G06F 13/14
[52] U.S. Cl. .................................. 711/150; 711/1; 711/5; 711/127; 711/147; 711/151; 711/168; 711/169; 710/112; 710/113; 710/118; 712/10; 370/351; 370/352; 370/353; 370/354; 370/355; 370/356; 370/357; 370/498; 365/189.02; 365/230.02; 365/230.03; 365/230.04
[58] Field of Search ........................... 395/474, 477, 395/479, 484, 298, 292–293, 800.1; 364/DIG. 1; 711/1, 127, 157–158, 5, 150, 151, 168–169; 365/189.02, 230.02, 230.03–230.04; 710/112–113, 118; 370/498, 351–357

[56] References Cited

U.S. PATENT DOCUMENTS

| | | | |
|---|---|---|---|
| 4,048,623 | 9/1977 | Gruner | 711/157 |
| 4,470,114 | 9/1984 | Gerhold | 395/291 |
| 4,847,757 | 7/1989 | Smith | 395/294 |
| 4,875,157 | 10/1989 | Frimmel et al. | 395/421.01 |
| 4,882,702 | 11/1989 | Struger et al. | 395/822 |
| 4,933,846 | 6/1990 | Humphrey et al. | 710/107 |
| 5,047,921 | 9/1991 | Kinter et al. | 395/474 |
| 5,133,059 | 7/1992 | Ziegler et al. | 711/140 |
| 5,471,588 | 11/1995 | Nimishakavi et al. | 395/293 |
| 5,581,734 | 8/1993 | Dibrino et al. | 711/169 |
| 5,598,575 | 1/1997 | Dent et al. | 395/800 |

Primary Examiner—John W. Cabeca
Assistant Examiner—Denise Tran
Attorney, Agent, or Firm—Blakely, Sokoloff, Taylor & Zafman LLP

[57] ABSTRACT

A system interconnect architecture and associated arbitration scheme that provides for the interleaving of multiple accesses to a shared system resource by multiple components on a data block by data block basis. According to one embodiment, an access request is granted "immediately" upon receipt such that the effective access latency between an access request and the transfer of a first data block (e.g. a byte, a word, a long word, and a double long word as determined by the width or throughput of the data path) for the access is the minimum access latency to the shared system resource. If a second access request is received while a first access is being performed, the second access request is granted immediately, and the first and second access are thereafter interleaved such that data blocks of the accesses are alternately transferred by the system interconnect.

3 Claims, 10 Drawing Sheets

DATA PATH ARCHITECTURE AND ARBITRATION SCHEME FOR PROVIDING ACCESS TO A SHARED SYSTEM RESOURCE

FIELD OF THE INVENTION

The present invention relates generally to system interconnects and more particularly to a data path architecture and arbitration scheme for providing access to a shared system resource.

BACKGROUND

Most data processing systems include a system interconnect that enables the exchange of data between system components. Typically, at least one of the system components acts as a resource that is shared by other system components, and the system interconnect provides access to the shared resource. For example, the system memory of a personal computer is typically used by most of the components of the personal computer system, and the data bus of the personal computer system provides access to the system memory.

The manner in which the system interconnect and its associated arbitration scheme are defined determines the minimum "access latency" to shared resources of the data processing system, wherein the minimum access latency is the minimum amount of delay between the time when a system component requests access to a shared resource and the time when the system component gains access to that resource. For synchronous system interconnects, access latency is typically expressed in "clock cycles."

Typically, if a first system component is performing a multiple clock cycle access to a shared resource, a second system component will be prevented from accessing the shared resource until the first system component has completed its access. Thus, the second system component remains idle while awaiting access, and the effective access latency for the second component is several clock cycles greater than the minimum access latency. The effective access latency becomes a critical parameter for maximizing the efficiency of data processing systems that include high speed system components because such system components may become idle while awaiting access to the shared resource, and the processing capabilities of such system components may be underutilized. Therefore, it is desirable to provide a system interconnect and associated arbitration scheme that minimize the effective access latency to shared resources.

SUMMARY OF THE INVENTION

The system interconnect architecture and associated arbitration scheme described below provide for the interleaving of multiple accesses to a shared system resource by multiple system components on a data block by data block basis. According to one embodiment, an access request is granted "immediately" upon receipt such that the effective access latency between an access request and the transfer of a first data block (e.g. a byte, a word, a long word, or a double long word as determined by the width or throughput of the data path) for the access is the minimum access latency to the shared system resource. If a second access request is received while a first access is being performed, the second access request is granted immediately, and the first and second accesses are thereafter interleaved such that data blocks of the accesses are alternately transferred by the system interconnect.

According to one embodiment, the system interconnect architecture and associated arbitration scheme are implemented in a data processing system that comprises:

- a first system component;
- a second system component;
- a shared system resource; and
- a system interconnect that interleaves a first multi-block access of the shared system resource by the first system component and a second multi-block access of the shared system resource by the second system component such that data blocks of the first and second multi-block accesses are alternately transferred by the system interconnect.

The number of system components for which minimum access latency for the first data block may be guaranteed is determined by the number of accesses that the system interconnect is able to interleave. For the described embodiments, "two access" interleaving is provided such that the minimum access latency to starting a data transfer is guaranteed for only two system components. As will be described, the system interconnect architecture may be readily adapted to provide "n access" interleaving wherein n system components are guaranteed minimum access latency for at least the first data block to be transferred.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

For the purposes of simplifying discussion, certain terminology will be used consistently throughout the specification. First, the term "data block" will be used to refer to the quantity of data that the system interconnect can transfer in a single clock cycle. Second, the term "access" will be understood to refer to both read and write operations, and the term "access request" will be understood to refer to requests for both read and write operations. Accesses may be "single block" accesses wherein a single data block is transferred or "multi-block" accesses wherein multiple data blocks are transferred. Third, the terms "interleaved" and "interleaving" will be understood to refer to the operation of alternating access to a shared system resource by multiple system components such that multiple transfers between the shared system resource and multiple system components are conducted simultaneously. The terms "interleaved" and "interleaving" are not meant to refer to "bank interleaving" or "page interleaving" wherein sequential memory addresses retrieve data from physically different memory banks to speed memory accesses, although bank interleaving and page interleaving may be used in the described data processing systems.

Exemplary Data Processing System

Figure 1:
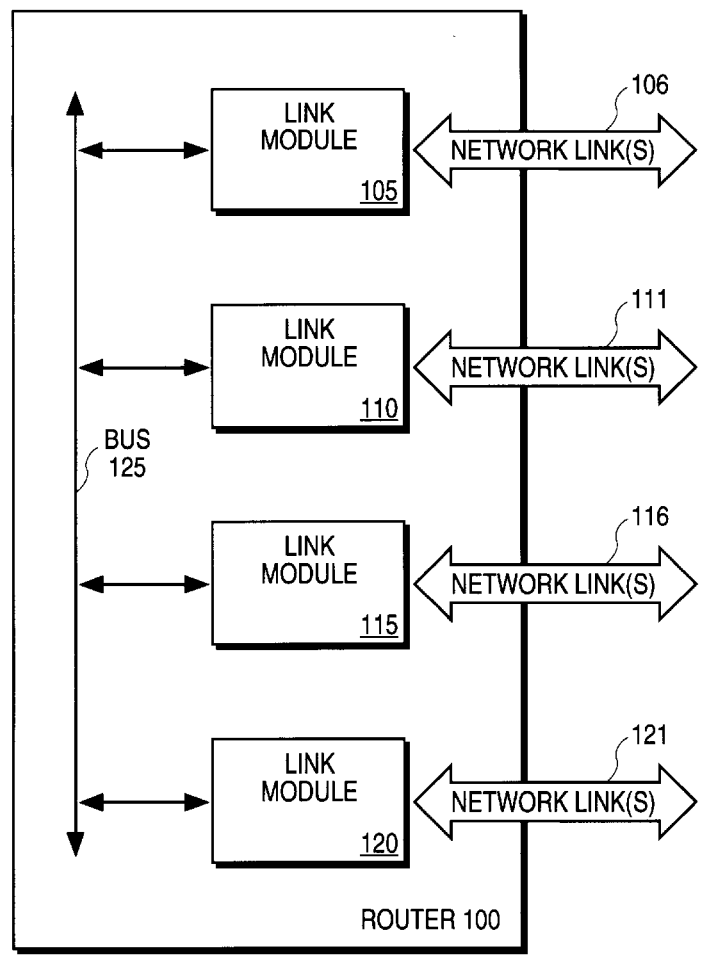
FIG. 1 shows a router as an exemplary data processing system.

FIG. 1 shows a data processing system that uses an improved system interconnect architecture and arbitration scheme as described below. More specifically, FIG. 1 shows a router 100 that may be used to interconnect a multiplicity of distinct packet-switched and cell-switched networks (not shown). Other types of data processing systems may benefit from the described system interconnect architecture, and a router is only described to demonstrate the advantages and features of the system interconnect architecture. For example, the system interconnect architecture may be used to provide access to the main memory of a personal computer system.

According to the present embodiment, router 100 comprises a backplane bus 125 having a multiplicity of connectors (not shown) each for receiving one the of link modules 105, 110, 115, and 120. Each link module includes one or more network interfaces ("network ports") each for connecting to a corresponding network link, wherein the connection between the network port(s) and network link(s) for each link module are implied in FIG. 1 by the connection between the illustrated network links and the respective link modules. Specifically, link modules 105, 110, 115, and 120 are shown as being connected to network links 106, 111, 116, and 121, respectively.

Router 100 operates as a loosely coupled multiprocessor system wherein each link module is capable of performing all router functions. For example, each link module processes packets received at its network port(s) by performing a forwarding/filtering look-up using routing tables (not shown). Possible responses to the look-up include, but are not limited to, dropping the packet (filtration), forwarding the packet to another physical network port of the link module (a "port-to-port" transaction), and forwarding the packet to another link module using bus 125 (a "module-to-module" transaction). Generally, the routing tables of the link modules tend to differ slightly because a link module must be able to determine whether to perform a port-to-port transaction or a module-to-module transaction. Bus 125 is used to transfer packets between the link modules such that module-to-module transactions of router 100 are invisible to connected networks.

Figure 2:
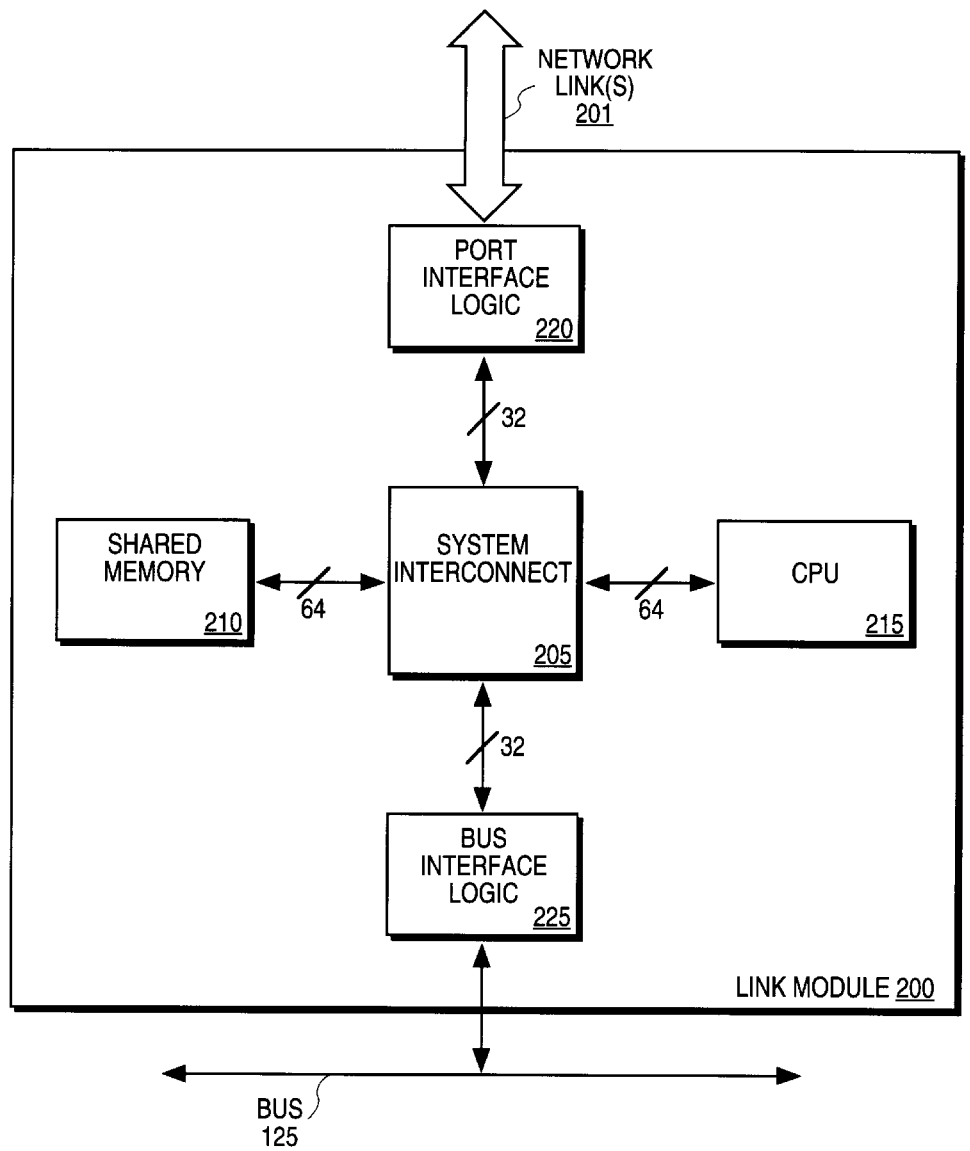
FIG. 2 shows a link module of the router in more detail.

To perform routing operations, each link module includes its own central processing unit (CPU), network port interface, bus interface, and shared memory, all of which are shown in FIG. 2. Packets received from the network ports and the bus are stored by the shared memory and processed by the CPU while stored in the shared memory. After the CPU processes a packet, the packet is sent to the appropriate destination (e.g. a network port interface or the bus interface). Therefore, each of the network port interface(s), the bus interface, and the CPU requires access to the shared memory.

Exemplary System Interconnect Architecture

FIG. 2 shows a link module 200 that includes a system interconnect 205, shared memory 210, CPU 215, port interface logic 220, and bus interface logic 225. Port interface logic 220 includes network port(s) (not shown) coupled to service network link(s) 201, and bus interface logic 225 is coupled to bus 125 for servicing module-to-module transactions. System interconnect 205 interconnects each of the CPU 215, port interface logic 220, and bus interface logic 225 to shared memory 210. As will be described, shared memory 210 is a shared system resource and includes arbitration circuitry for controlling access to system interconnect 205.

According to the present embodiment, system interconnect 205 comprises a parallel data path that is arranged to operate like a crossbar switch wherein data is only transferred between shared memory 210 and one other device during any given clock cycle. System interconnect 205 is not used to provide direct connections between CPU 215, port interface logic 220, and bus interface logic 225, but system interconnect 205 can be modified to provide such functionality for alternative data processing systems. One possible implementation of system interconnect 205 is described with respect to FIG. 5.

System interconnect 205 and shared memory 210 are selected to have a data path width that is, at a minimum, equal to the data path width of the critical path component, which, for this embodiment, is CPU 210. Thus, shared memory 210 and system interconnect 205 provide a 64-bit data path when CPU 205 has a 64-bit data bus, and a 64-bit transfer of data between CPU 205 and shared memory 210 can occur within a single clock cycle. Port interface logic 220 and bus interface logic 225 are shown as having 32-bit data buses. According to the present embodiment, system interconnect 205 transfers sixty four (64) bits of data from/to shared memory 210 in a single clock cycle regardless of the destination/source of data which ensures that the full bandwidth of system interconnect 205 is used during each memory access. One example of how the 64-bit data path of system interconnect 205 interfaces with 32-bit data paths is described with respect of FIG. 5. According to alternative embodiments, system interconnect 205 may comprise a high-speed serial link.

According to the present embodiment, the data path width of the critical path component also happens to be the maximum data path width of the data processing system. One advantage of selecting the data path width of system interconnect 205 to be the maximum data path width of the data processing system is that a full data block for a system component that has the maximum data path width may be transferred in a single clock cycle. For example, system interconnect 205 can provide a 64-bit data block to the CPU in a single clock cycle. The system interconnect also transfers 64-bit data blocks to the port and bus interfaces, but a 64-bit data block is ultimately received by the port and bus interfaces as two 32-bit blocks during sequential clock cycles. Using all of the bandwidth of the system interconnect regardless of the source or destination of transferred data results in the efficient use of the bandwidth of system interconnect 205.

Figure 3:
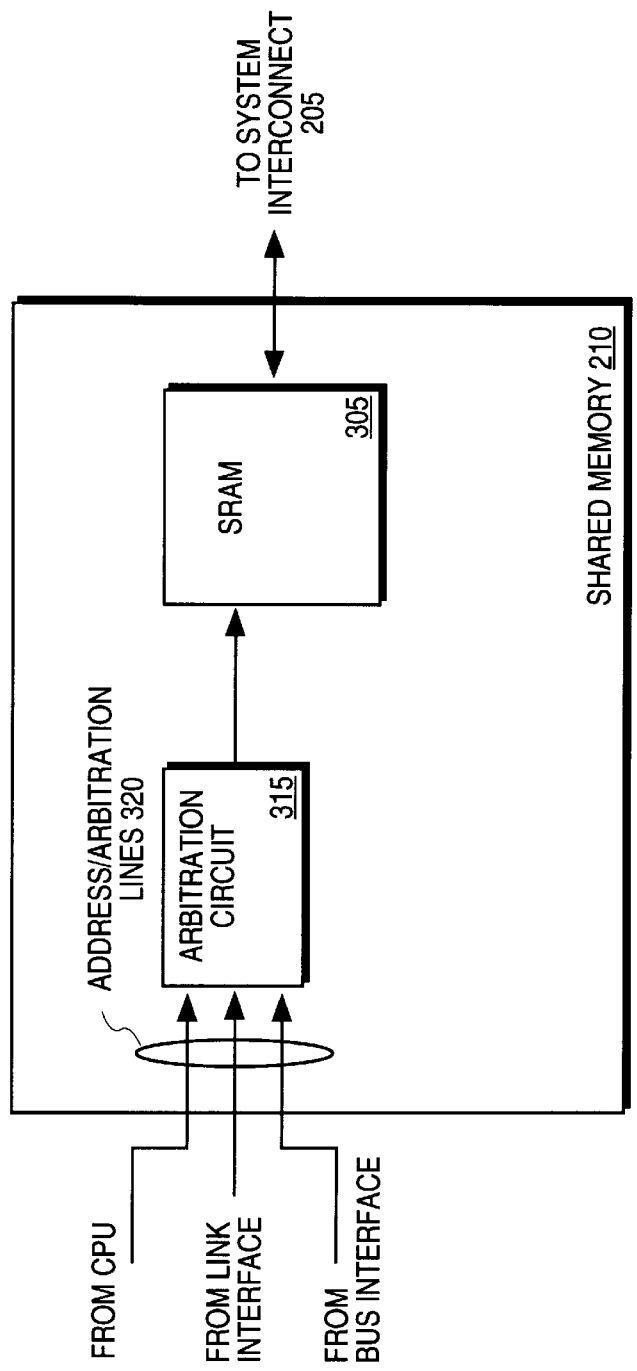
FIG. 3 shows a shared memory system as an exemplary shared system resource.

FIG. 3 shows shared memory 210 in more detail. According to the present embodiment, shared memory 210 comprises one or more banks of static random access memory (SRAM) 305 and an arbitration circuit 315. Arbitration circuit 315 performs the arbitration protocol for system interconnect 205 to provide access to SRAM 305 as requested by the CPU, the port interface logic, and the bus interface logic. SRAM 305 stores the data packets in response to the control signals provided by arbitration circuit 315. Arbitration circuit 315 is illustrated as being "included"

in shared memory 210 to facilitate discussion, and arbitration circuit 315 may be provided within a data processing system in any convenient manner. For example, arbitration circuit 315 may be provided on-chip for some types of shared system resources. For the present embodiment, arbitration circuit 315 may be properly viewed as a memory controller because it controls accesses to SRAM 305, and arbitration circuit 315 may be adapted to provide interleaved accesses to DRAM.

Arbitration circuit 315 is coupled to address and arbitration lines 320 for detecting access requests from each of the CPU, the port interface logic, and the bus interface logic. Each access request includes control signals for requesting a data transfer including an indication of the type of access and the address of the first data block of the access (the "base address" of the access). Arbitration circuit 315 determines which system component is to be provided access to shared memory 210 in response to the arbitration signals. Once arbitration circuit 315 grants access to a system component, the address provided by that component is passed to SRAM 305 along with the appropriate chip select and enable signals to access the first data block. If shared memory 210 utilizes a logical addressing scheme, arbitration circuit 315 may also provide logical-to-physical address translation.

Exemplary Arbitration Scheme

As mentioned above, the system interconnect architecture provides for interleaving transfers between a shared system resource and multiple system components such that a requesting system component may be guaranteed access to the system interconnect with minimum access latency between issuing the request and transferring the first data block of a requested access. The latency between any two data blocks of a multi-block access is determined by the number of data transfers that are being interleaved.

The arbitration scheme used by arbitration circuit 315 of the present embodiment is quite simple: a requesting device is "immediately" granted access to the shared system resource if the maximum number of interleaved accesses are not being interleaved when the request is received. For the purposes of discussion, "immediately" is understood to mean within the minimum access latency of the system interconnect, which is typically at least one clock cycle. The system interconnect architecture of the present embodiment only provides for the interleaving of two accesses to shared memory 210 at a time, and if a third component requests access while two accesses are being interleaved, the third component must wait until one of the two accesses completes before gaining access. According to alternative embodiments, "n way" interleaving may be provided, and a particular system component (e.g. the CPU) may be provided a priority level that allows an access by another component to be interrupted such that the priority system component may be granted immediate access.

Exemplary Arbitration Circuit

Figure 4:
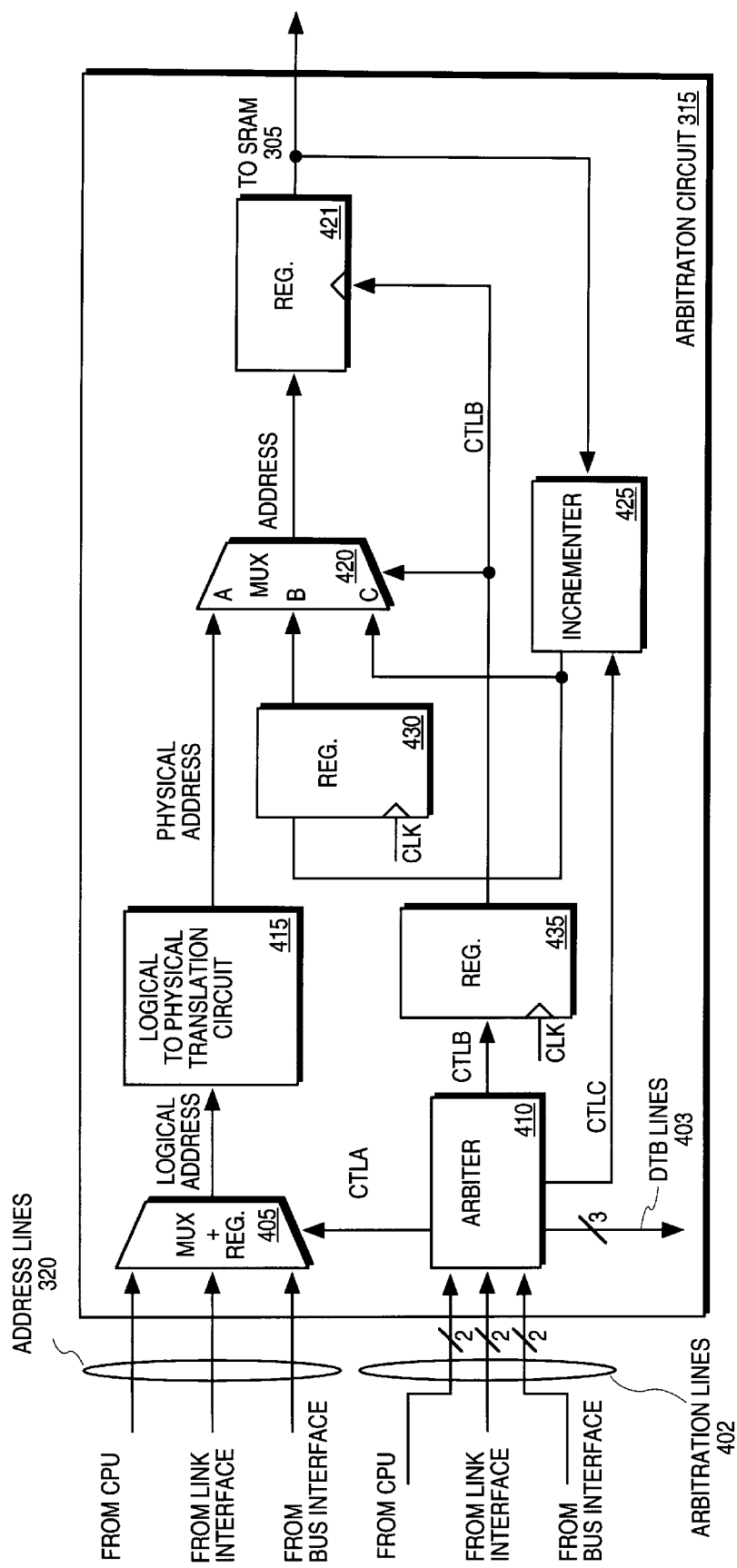
FIG. 4 shows an arbitration circuit of one embodiment.

FIG. 4 shows arbitration circuit 315 as comprising multiplexer 405, arbiter 410, logical-to-physical translation circuit 415 (optional), multiplexer 420, register 421, incrementer 425, register 430, and register 435 (optional). Each of the registers 430 and 435 is shown as being coupled to receive a system clock signal CLK, which operates to enable and disable the registers from latching data presented at their inputs. Aribtration circuit 315 includes additional circuitry (not shown) for issuing the appropriate chip selects and control signals for accessing SRAM 305.

Generally, multiplexer 405 is coupled to receive memory addresses from each of the system components. Multiplexer 405 is shown as "including" a register (optional) for latching received memory addresses. Arbiter 410 controls multiplexer 405 using a first control signal CTLA to pass one of the addresses in response to arbitration signals received from each of the system components. Arbiter 410 may be implemented as a state machine, a logic circuit, a processor, or software. The arbitration signals of one implementation are described in more detail below.

According to the present embodiment, the memory addresses provided by the system components are logical addresses, and logical-to-physical translation circuit 415 is provided to translate the logical address passed by multiplexer 405 into a physical address that can be used to access SRAM 305. Logical-to-physical translation circuit 415 introduces one clock cycle of access latency. If the data processing system does not use logical addressing, logical-to-physical translation circuit 415 may be removed such that the access latency is reduced by one clock cycle.

The physical address output by logical-to-physical translation circuit 415 is provided to an "A" input of multiplexer 420, which is controlled by a second control signal CTLB issued by arbiter 410 via register 435. Multiplexer 420 is selected to output the physical address by arbiter 410, and the physical address is delivered to register 421, which, after one clock cycle, outputs the physical address to access SRAM 305 such that the first data block is available to system interconnect 205 at the beginning of the third clock cycle following the request.

The address output by register 421 is also coupled to incrementer 425, which increments the physical address in a manner to access the next consecutive data block of a data transfer. According to the present embodiment, SRAM 305 outputs 64-bit data blocks, and CPU 215 can request multi-block transfers having a maximum of four 64-bit data blocks, wherein port interface logic 220 and bus interface logic can request multi-block transfers having a maximum of eight 64-bit data blocks. A requesting device can supply the base address of any of the data blocks of a multi-block access, and the base address is incremented and caused to "wrap-around" such that all the data blocks of a multi-block access are transferred. The "wrap-around" boundaries for eight data block transfers (the base address plus seven incremented addresses) and four data block transfers (the base address plus three incremented addresses) are different, and arbiter 410 supplies a third control signal CTLC to incrementer 425 such that incrementer 425 wraps on either the four data block boundary or the eight data block boundary, as determined by the data transfer that is currently accessing SRAM 305.

Incrementer 425 provides the incremented address to the input of register 430 and to a "C" input of multiplexer 420. Register 430 delays the incremented address by one clock cycle and presents the delayed address to a "B" input of multiplexer 420. Register 430 can be used to store the next address of a first access when a data block of a second access is currently being read, and arbiter 410 can interleave two accesses by enabling the appropriate input of multiplexer 420 to transfer an address to the output of multiplexer 420.

For example, the A input of multiplexer 420 is coupled to receive the address of a first data block of a transfer, the C input of multiplexer 420 is coupled to receive the address of a next data block of a transfer, and the B input of multiplexer 420 is coupled to receive a delayed address. When only one access is occurring, the base address at the A input of multiplexer 420 is initially fed to the output of multiplexer 420 such that the first data block may be transferred, and the C input of multiplexer 420 is enabled thereafter to pass successively incremented addresses until the multi-block access is complete.

Alternatively, when a first access is being performed and a second access is requested, the first access is temporarily suspended, and the A input of multiplexer 420 is enabled to pass the base address of the second access. Register 430 operates as a storage element that saves the incremented address of the first access, and the B input of multiplexer 420 is enabled to output the delayed address on the next clock cycle. The B input is enabled thereafter. For each clock cycle thereafter, the output of register 430 alternates between the address for the first access and the address for the second address. Thus, system interconnect 205 alternates the access of data blocks for the first and second transfers on a cycle-by-cycle basis. The manner in which multiple memory accesses are interleaved using the circuitry of FIG. 4 is discussed below with respect to FIGS. 6–8.

According to the present embodiment, arbitration lines 402 and DTB control lines 403 are used to control the transfer of data between the system components and shared memory 210 via system interconnect 205. Arbiter 410 is coupled to receive arbitration signals from each of the CPU, the port interface logic, and the bus interface logic via arbitration lines 402 wherein each system component is provided with a unique set of arbitration lines. Each set of arbitration lines includes one signal line for conveying a REQUEST signal and one signal line for conveying a $DONE_{13}$ BLK signal. A device asserts its REQUEST signal if it requires access to shared memory 210. A device continues to assert its REQUEST signal until the first data block of a memory access has been read from memory. A device asserts its $DONE_{13}$ BLK signal to indicate when the last data block of a requested access has been transferred. Arbiter 410 is shown as being coupled to DTB signal lines 403 for issuing DTB control signals that indicate when a memory access request for a system component is being serviced so that the system component is informed to retrieve data from system interconnect 205 during the next clock cycle. Each system component is provided with a unique DTB signal line that is asserted at the appropriate time by arbiter 410.

Figure 5:
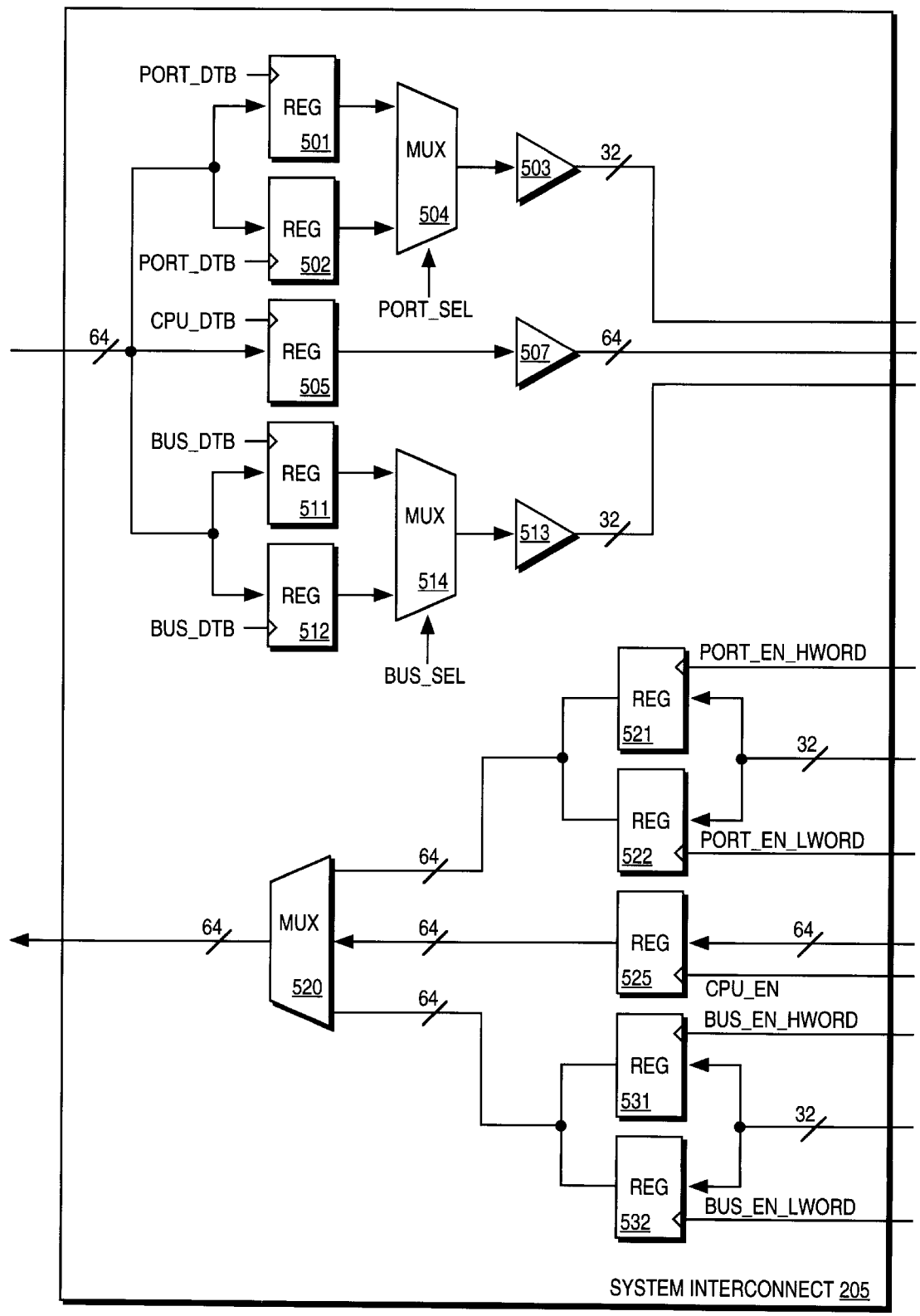
FIG. 5 shows a system interconnect of one embodiment.

FIG. 5 shows a system interconnect 205 according to the present embodiment. System interconnect 205 generally comprises a read path and a write path. The read path generally comprises registers 501, 502, 505, 511, and 512, and buffers 503, 507, and 513, and multiplexers 504 and 514. Registers 501, 502, buffer 503, and multiplexer 504 are provided as the read path to the port interface logic. As the output of the SRAM is 64 bits wide and the input to the port interface logic is 32 bits wide, register 501 is coupled to store the high 32 bits of the 64 bit output of SRAM 305, and register 502 is coupled to store the low 32 bits of the output of the SRAM 305. The DTB signal of the port interface logic, PORT_DTB, is coupled to the enables inputs of registers 501 and 502 to load registers 501 and 502 in response to PORT_DTB being asserted. A select signal PORT_SEL is provided to control multiplexer 504 to successively output the contents of registers 501 and 502. Register 505 and buffer 507 are provided as the read path to the CPU. Register 505 is 64 bits wide and is enabled to load data in response to the DTB signal of the CPU (CPU_DTB). Registers 511 and 512, buffer 513, and multiplexer 514 are provided as the read path to the bus interface logic. Registers 511 and 512 operate similarly to registers 501 and 502, described above, except that registers 511 and 512 are loaded in response to the assertion of the BUS_DTB signal, the DTB signal for the bus interface logic.

The write path of system interconnect 205 generally comprises multiplexer 520 which outputs 64 bits to SRAM 305. The write path further includes registers 521, 522, 525, 531, and 532. Registers 521 and 522 are the write path for the port interface and operate similarly to registers 501 and 502 except that the control signals PORT_EN_HWORD and PORT_EN_LWORD are used to successively enable registers 521 and 522 to be loaded with data from the port interface logic. Register 525 is the write path from the CPU and is enabled to load data in response to a CPU_EN control signal. Registers 531 and 532 are the write path from the bus interface logic and are controlled by BUS_EN_HWORD and BUS_EN_LWORD, respectively.

Figure 6:
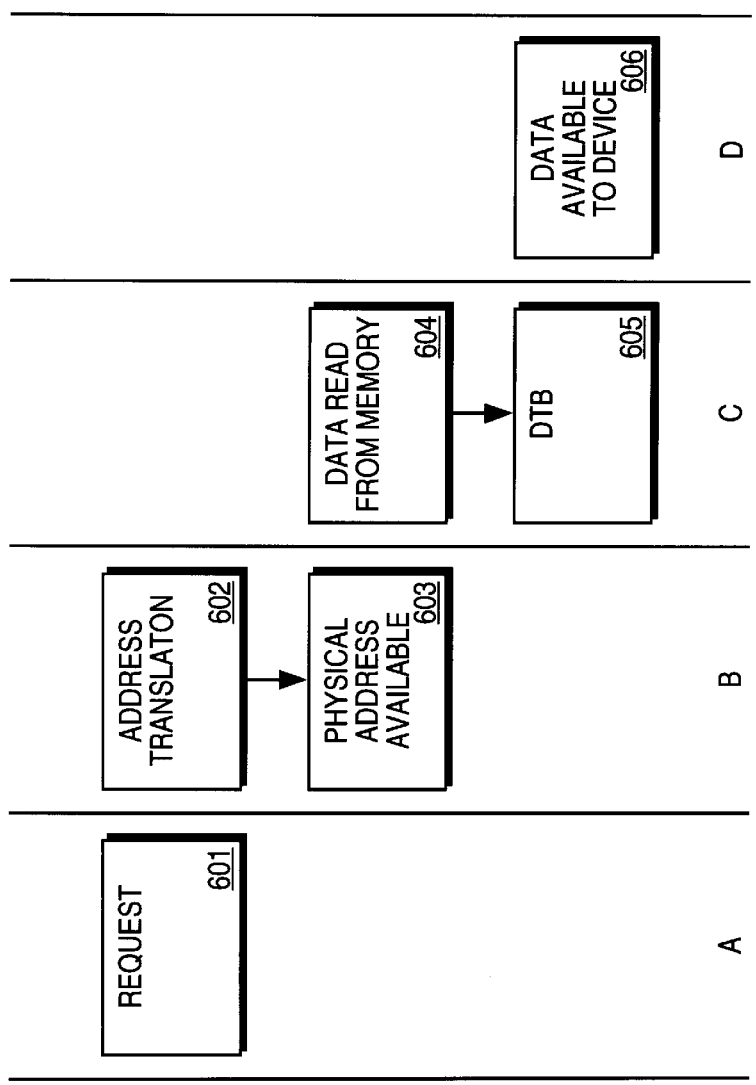
FIG. 6 shows a single-block access of the shared system resource according to one embodiment.

FIG. 6 shows a basic memory access request cycle for system interconnect and the arbitration logic of shared memory. During cycle A, a device issues a request, as shown in block 601. For example, the CPU may issue a read request. If logical addressing is provided, during cycle B address translation is performed as shown in block 602, and the physical address becomes available, as shown in block 603. During cycle C, data is read from the memory as shown in block 604, and SRAM control logic asserts the DTB signal of the requesting device to indicate that the requested data will be available for the next clock cycle. During the subsequent cycle D, data is available to the device for reading as shown in block 606.

Figure 7:
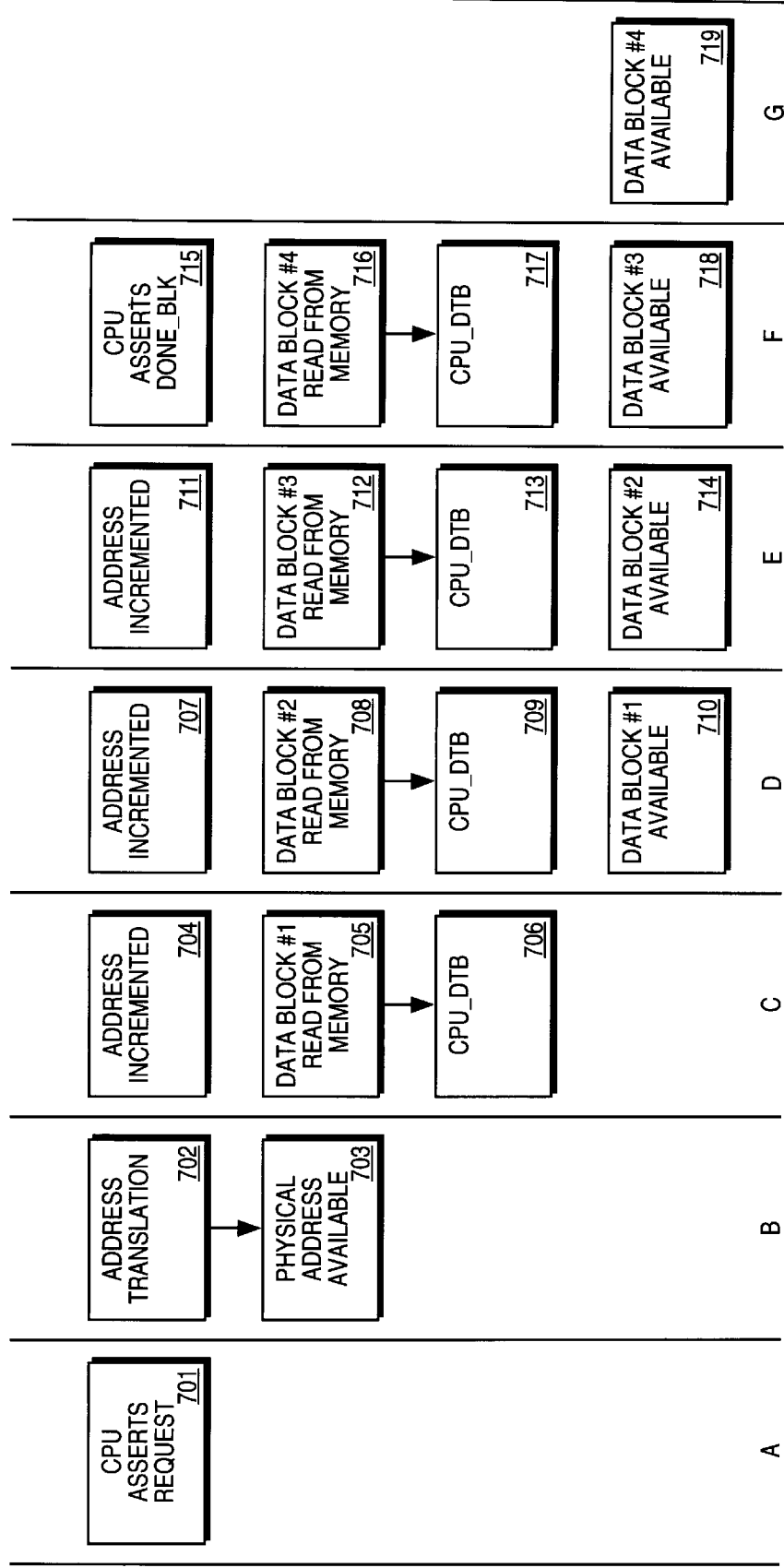
FIG. 7 shows a multi-block access of the shared system resource according to one embodiment.

FIG. 7 shows an example of a multi-block access. More specifically, FIG. 7 shows a multi-block read access by the CPU wherein four data blocks are transferred from the shared memory. During clock cycle A at block 701, the CPU provides the base address of the multi-block access and asserts its REQUEST signal. Address translation occurs at clock cycle B such that the physical address is available during clock cycle B, as shown by blocks 702 and 703, respectively. During clock cycle C, as shown by blocks 704–706, the base address is incremented, the first data block of the read access is read from memory, and the SRAM control logic issues the DTB signal of the CPU to indicate that the first data block will be available during the next clock cycle. During clock cycle D, the second data block is read from memory, the CPU_DTB signal of the CPU is asserted, the first data block is available at the system interconnect, and the address is incremented again, as shown by blocks 707–710. The CPU asserts the appropriate control signals shown in FIG. 5 to retrieve the first data block. The actions taken during clock cycle E are substantially identical to those of clock cycle D. During clock cycle F, there are no further data blocks to be retrieved, and the CPU asserts its DONE_BLK signal to indicate that the access has completed. The fourth and final data block of the access is available at the system interconnect during clock cycle G.

Figure 8:
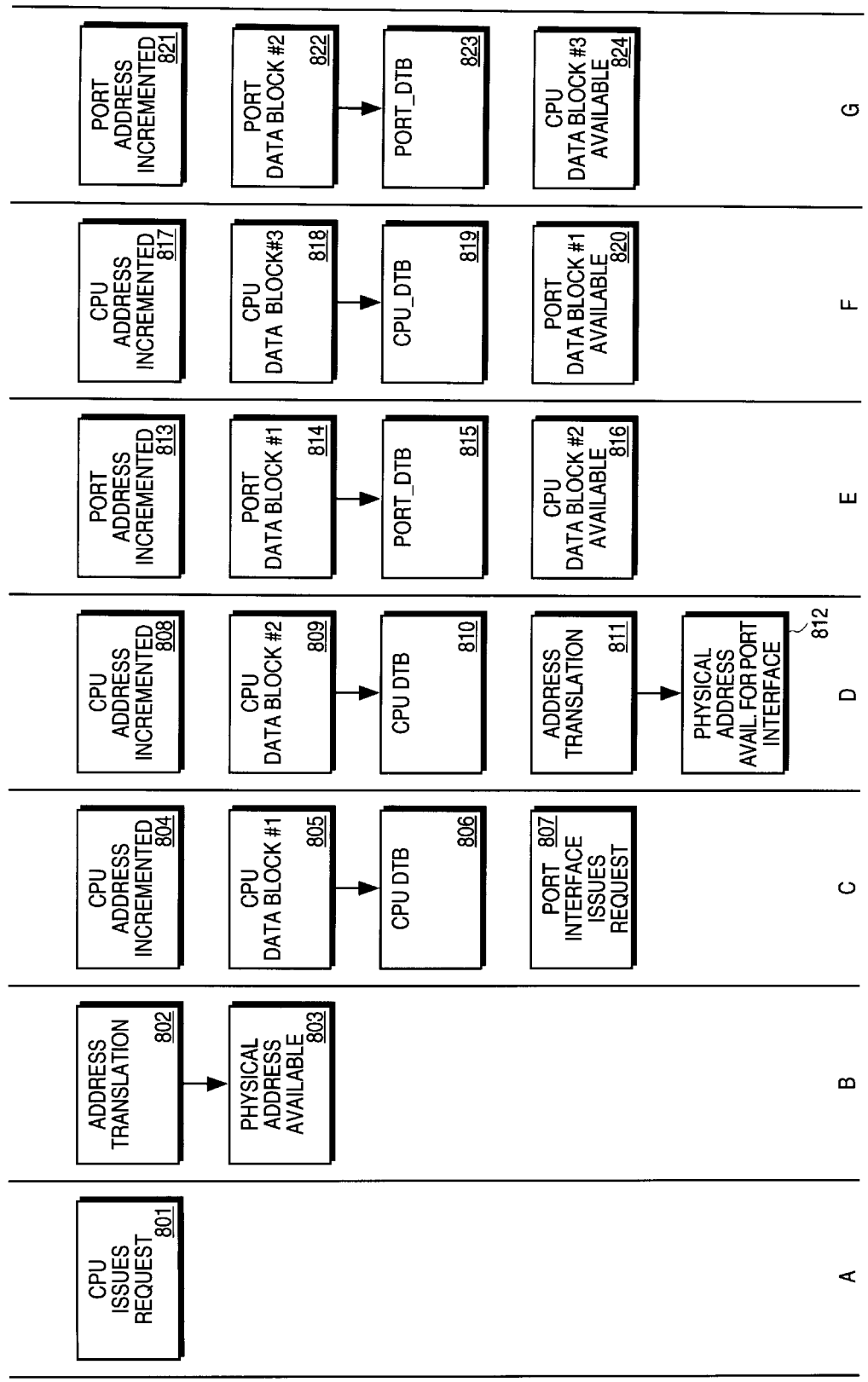
FIG. 8 shows the interleaving of two multi-block accesses according to one embodiment.

FIG. 8 shows a first access that is interrupted and interleaved with a second access. In clock cycle A, the CPU asserts its REQUEST signal, and address translation occurs during clock cycle B such that the physical address of the first memory block for the CPU access is made available, as shown in blocks 801–803. During clock cycle C, as shown by blocks 804–806, the base address for the CPU access is incremented, the first data block of the CPU access is read from memory, and the SRAM control logic issues the CPU_DTB signal to indicate that the first data block of the CPU access will be available during the next clock cycle. The port interface logic also asserts its REQUEST signal during clock cycle C, as shown by block 807. During clock cycle D, the second data block of the CPU access is read from memory, the CPU_DTB signal is asserted, the first data block of the CPU access is available at the system interconnect, and the address for the CPU access is incremented again, as shown by blocks 808–810. Address translation for the port interface access also occurs during clock cycle D such that the physical address of the first memory block for the port interface access is made available, as shown by blocks 811 and 812.

During clock cycle E, the first data block of the port interface's access is read from memory, the PORT_DTB signal is asserted, the base address of the port interface's access is incremented, and the second data block of the CPU's access is available at the system interconnect, as shown by blocks 813–816. During clock cycle F, the third data block of the CPU's access is read from memory, the CPU_DTB signal is asserted, the address of the CPU's access is incremented, and the first data block of the port interface's access is available at the system interconnect, as shown by blocks 817–820. During clock cycle G, the second data block of the port interface's access is read from memory, the PORT_DTB signal is asserted, the address of the port interface's access is incremented, and the third data block of the CPU's access is available at the system interconnect, as shown by blocks 821–824.

The arrangement shown in FIG. 4 provides for two-access interleaving wherein the first data block of any requested access is typically provided within the minimum access latency of two clock cycles. For some implementations, however, it is possible or even desirable that an additional clock cycle of latency be introduced. As previously described, wherein system interconnect 205 provides a 64-bit data path, port interface logic 220 and bus interface logic 225 each can only use thirty-two bits per clock cycle, and SRAM 205 is actually accessed once every two clock cycles for accesses initiated by the port and bus interfaces. Depending on how multiplexer 420 is configured, it is possible that the start of a second access must be delayed by one clock cycle to ensure that the next address of the first access is not "lost" because register 430 can only delay the address of an access for a single clock cycle.

Figure 9:
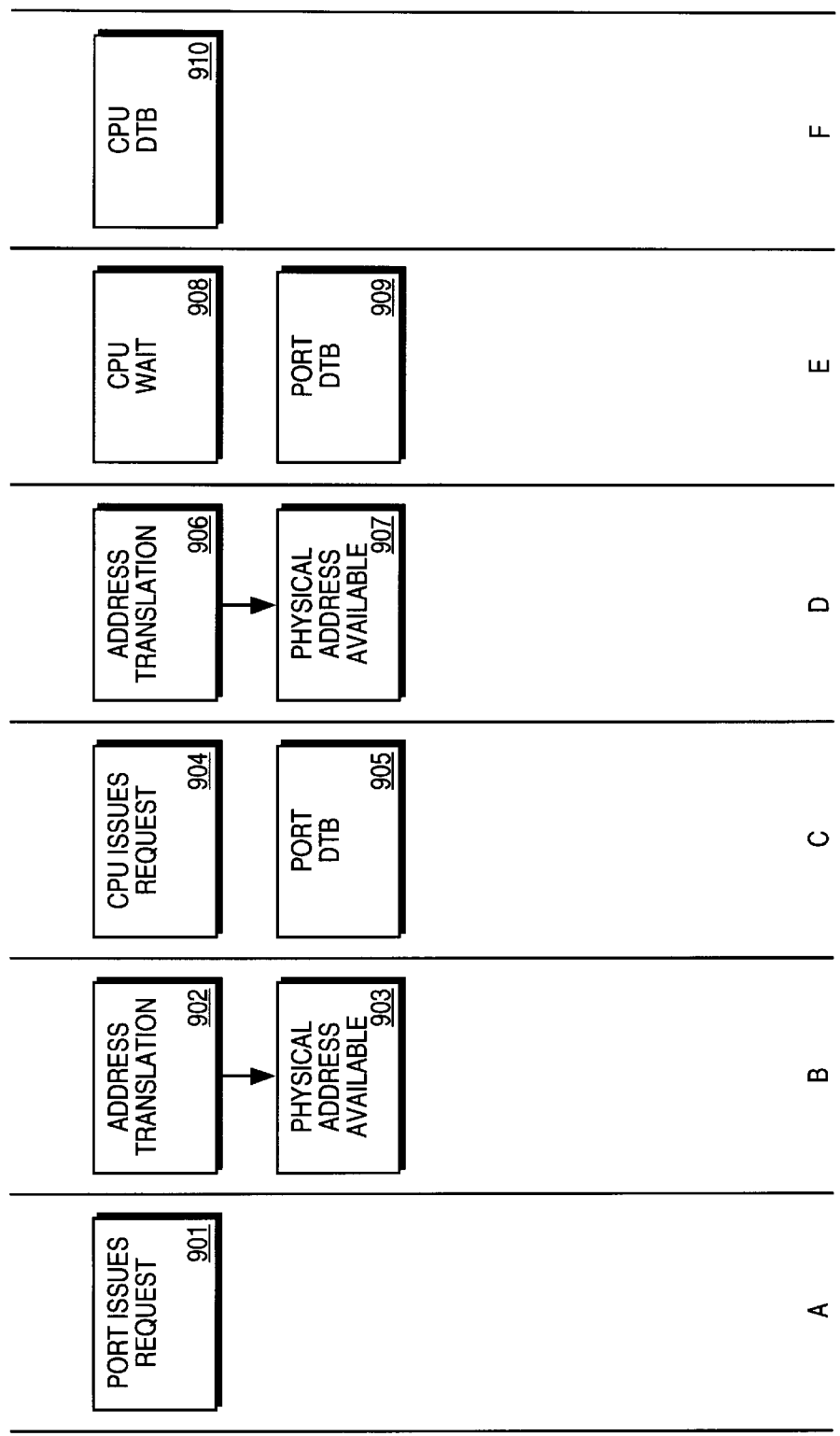
FIG. 9 shows how a wait state may be introduced when interleaving two accesses.

FIG. 9 shows how a wait state may be introduced when interleaving two accesses. FIG. 9 assumes the multiplexing arrangement of FIG. 4 wherein the C input of multiplexer 420 is selected by default to output the incremented address each clock cycle once a multi-block access has begun, and the address is incremented once every clock cycle. This allows for the transfer of a continuous stream of 64-bit data blocks for the CPU. Wherein the transferring system component has a 32-bit data path, SRAM 205 is not accessed in response to the incremented address each clock cycle. Instead, the delayed incremented address is passed through input B of multiplexer 420 to access the next data blocks.

During clock cycle A, the port interface requests an access at block 901. During clock cycle B, address translation occurs at block 902, and the A input of multiplexer 420 is enabled such that the base address of the port interface access is available at block 903. During clock cycle C, the PORT_DTB signal is asserted at block 905 to indicate that data will be available at the interconnect during the next clock cycle. Also during clock cycle C, the CPU issues an access request at block 904.

During clock cycle D, address translation of the base address provided for the CPU access occurs at block 906, but the A input of multiplexer 420 is not enabled to pass the base physical address of the CPU address, which is available at block 907. Instead, the B input of multiplexer 420 is enabled to pass the incremented address for the port interface access (not shown). Normally, the base physical address for the CPU access and the CPU_DTB signal would be provided during clock cycle D. Because register 430 can only provide one clock cycle of delay, the next address of the port interface access must be provided during clock cycle D, or the next address will be lost. Thus, the A input of multiplexer 420 is not selected to pass the base physical address of the CPU access until clock cycle E, and the CPU is forced to wait at block 908. The PORT_DTB signal is asserted at block 909. During clock F, the CPU_DTB signal is asserted at block 912.

Figure 10:
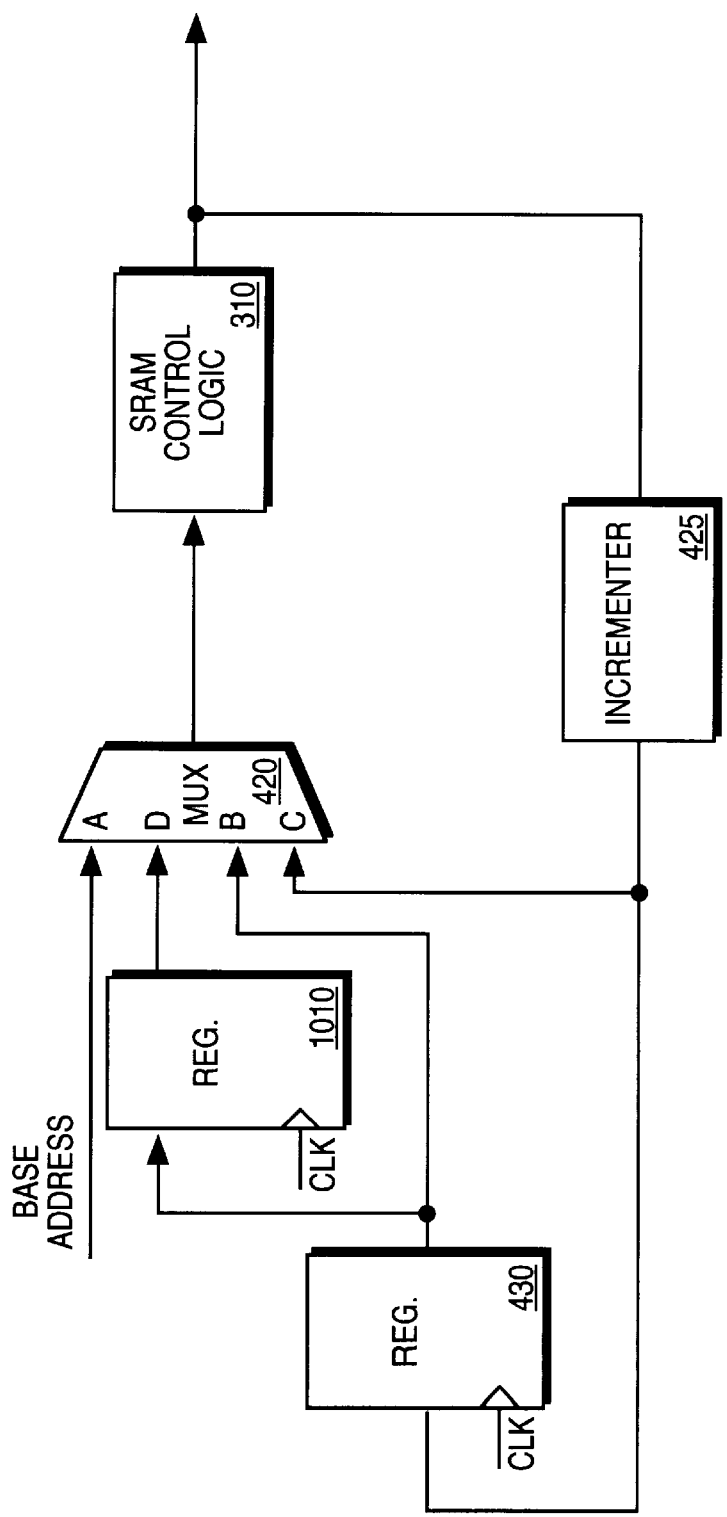
FIG. 10 shows an alternative mutliplexing arrangement that may be used to control accesses to memory according to one embodiment.

As shown in FIG. 10, for the case of two-access interleaving, the minimum access latency of two clock cycles may be ensured by providing a fourth ("D") input to multiplexer 420 and connecting a register 1010 between the output of register 430 and the D input such that the D input receives an incremented address delayed by two clock cycles. An alternative way to ensure minimum access latency is to ensure that the output of incrementer 425 does not change unless SRAM 305 is actually accessed in response to the address output by multiplexer 420. For example, the clocking of register 430 may be disabled such that the output of register 430 remains fixed, incrementer 425 may be disabled such that the output of incrementer 425 remains fixed, or the output of multiplexer 420 may be latched and multiplexer 420 may be disabled such that input to incrementer 425 remains fixed.

The arrangement shown in FIG. 10 also allows a third access to be interleaved. By cascading additional registers and providing additional multiplexer inputs as shown in FIG. 10, the basic arrangement shown in FIG. 4 can be adapted to provide n-access interleaving. For n-access interleaving, the first block is still delivered within the minimum access latency, but each subsequent block of each interleaved access is provided within n–1 clock cycles.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A processing system comprising:
   a shared system resource;
   a first system component to request a first multi-block access to the shared system resource;
   a second system component to request a second multi-block access to the shared system resource; and
   a system interconnect to couple the first and second system components to the shared system resource in a manner that guarantees the first system component access to the shared system resource within a minimum access time if the second system component is currently accessing the shared system resource, and to interleave the first multi-block access and the second multi-block access such that data blocks of the first and second multi-block accesses are alternately transferred by the system interconnect, said system interconnect comprising:
   an arbitration circuit coupled to receive access requests from the first and second system components, the arbitration circuit immediately granting access requests when they are received, said arbitration circuit comprising:

an arbiter coupled to grant the access requests received from the first and second system components;

a first multiplexer coupled to receive addresses associated with the access requests received from the first and second system components, the first multiplexer being controlled by the arbiter to output addresses; and a second multiplexer having a first input coupled to receive the addresses output by the first multiplexer, a second input coupled to receive an incremented address, and a third input coupled to receive a delayed incremented address, wherein the arbiter controls the second multiplexer to alternately output the addresses of a first access of the first system component and a second access of the second system component such that the first and second accesses are interleaved.

2. A data processing system comprising:

a plurality of system components;

a shared system resource; and a system interconnect to couple the plurality of system components to the shared system resource in a manner that guarantees one of the system components access to the shared system resource within a minimum access time if another one of the system components is currently accessing the shared system resource, and to interleave multi-block accesses of the shared system resource by the plurality of system components such that data blocks of the multi-block accesses are alternately transferred by the system interconnect, said system interconnect comprising:

an arbitration circuit coupled to receive access requests from the plurality of system components, the arbitration circuit immediately granting access requests when they are received, said arbitration circuit comprising:

an arbiter coupled to grant the access requests received from the plurality of system components;

a first multiplexer coupled to receive addresses associated with the access requests received from the plurality of system components, the first multiplexer being controlled by the arbiter to output addresses; and a second multiplexer having a first input coupled to receive the addresses output by the first multiplexer, a second input coupled to receive an incremented address, and additional inputs coupled to receive a plurality of delayed incremented addresses, wherein the arbiter controls the second multiplexer to alternately output addresses for accesses by the plurality of system components such that the accesses are interleaved.

3. A data processing system comprising:

a first system component;

a second system component;

a memory;

a system interconnect that interconnects the system components and the memory; and a memory controller coupled to the system interconnect to guarantee access by the first system component to the memory within a minimum access time if the second system component is currently accessing the memory, and to interleave a first multi-block access of the memory by the first system component and a second multi-block access of the memory by the second system component such that data blocks of the first and second multi-block accesses are alternately transferred between the memory and the first system component and between the memory and the second system component, said memory controller comprising:

an arbitration circuit coupled to receive access requests from the first and second system components, the arbitration circuit immediately granting access requests when they are received, said arbitration circuit comprising:

an arbiter coupled to grant the access requests received from the first and second system components;

a first multiplexer coupled to receive addresses associated with the access requests received from the first and second system components, the first multiplexer being controlled by the arbiter to output addresses; and a second multiplexer having a first input coupled to receive the addresses output by the first multiplexer, a second input coupled to receive an incremented address, and a third input coupled to receive a delayed incremented address, wherein the arbiter controls the second multiplexer to alternately output the addresses of a first access of the first system component and a second access of the second system component such that the first and second accesses are interleaved.

* * * * *